United States Patent [19]

Rukavina

[11] Patent Number: 5,161,048
[45] Date of Patent: Nov. 3, 1992

[54] ELECTROCHROMIC WINDOW WITH METAL GRID COUNTER ELECTRODE AND ACIDIC POLYELECTROLYTE

[75] Inventor: Thomas G. Rukavina, Lower Burrell, Pa.

[73] Assignee: PPG Industries, Inc., Pittsburgh, Pa.

[21] Appl. No.: 633,893

[22] Filed: Dec. 26, 1990

[51] Int. Cl.⁵ .................................................. G02F 1/01
[52] U.S. Cl. .................................... 359/275; 359/270; 359/266
[58] Field of Search ................ 350/357; 359/267, 270, 359/269, 275, 266

[56] References Cited

U.S. PATENT DOCUMENTS

| | | | |
|---|---|---|---|
| 3,521,941 | 7/1970 | Deb et al. | 350/160 |
| 4,088,392 | 5/1978 | Meyers | 350/357 |
| 4,088,395 | 5/1978 | Giglia | 350/357 |
| 4,116,545 | 9/1978 | Reddy | 350/357 |
| 4,174,152 | 11/1979 | Giglia et al. | 350/357 |
| 4,335,938 | 6/1982 | Giglia | 350/357 |
| 4,361,385 | 11/1982 | Huang et al. | 350/357 |
| 4,375,318 | 3/1983 | Giglia et al. | 350/357 |
| 4,478,991 | 10/1984 | Huang et al. | 526/287 |
| 4,645,308 | 2/1987 | Tracey et al. | 350/357 |
| 4,768,865 | 9/1988 | Greenberg et al. | 350/357 |

*Primary Examiner*—William Mintel
*Assistant Examiner*—Roy K. Potter
*Attorney, Agent, or Firm*—Donna L. Seidel

[57] ABSTRACT

An electrochromic transparency comprising an electrochromic film and an ion-conductive layer disposed between a pair of electrodes is disclosed wherein the optical properties and electrochromic efficiency are improved by means of a metal grid electrode, wherein adhesion of the metal grid to an acidic polymer electrolyte is improved by means of a primer coating comprising a copolymer of acrylamidopropane sulfonic acid and acrylic acid.

19 Claims, 3 Drawing Sheets

ELECTROCHROMIC WINDOW WITH METAL GRID COUNTER ELECTRODE AND ACIDIC POLYELECTROLYTE

BACKGROUND OF THE INVENTION

This invention relates generally to the art of electrochromic cells, and more particularly to the art of transparent electrochromic windows.

Electrochromic devices have been proposed for use in alpha-numeric display panels in items such as digital watches, calculators and the like. The electrochromic image formed by the application of an appropriate voltage to an electrochromic cell persists for a useful period after the activating voltage is discontinued, generally until it is erased by application of an appropriate voltage of reversed polarity.

U.S. Pat. No. 3,521,941 to Deb et al. discloses an electro-optical device having variable optical density useful in data display comprising a pair of transparent electrodes, and a film of transition metal compound and a current carrier permeable insulator disposed between the electrodes, the device exhibiting alternate coloration and bleaching at ambient temperature by control of the polarity of an applied electric field.

U.S. Pat. No. 4,088,392 to Meyers discloses an electro-optical device comprising a pair of electrodes, and a film of a transition metal compound and a liquid electrolyte disposed between the electrodes, the device exhibiting coloration and bleaching thereof by control of the polarity of an applied electric field.

U.S. Pat. No. 4,088,395 to Giglia discloses a method for forming a counter-electrode in a variable light modulating device of the electrochromic type. The counter-electrode is a paper composition of fibrous pulp and carbon.

U.S. Pat. No. 4,116,545 to Reddy discloses an electrochromic variable light modulating device including an improved ion conducting layer comprising a polymeric composition containing polyethylene sulfonic acid, a pigment and water. One of the electrodes comprises a glass substrate with an electroconductive layer of tin oxide over which is deposited an electrochromic tungsten oxide film. The second electrode is a paper electrode comprising a web of filament permeated with carbon, and is compression bonded to tin oxide coated glass.

U.S. Pat. No. 4,174,152 to Giglia et al. discloses electrochromic devices wherein the polymeric electrolyte material is a hydrophilic copolymer of a selected acrylate or methacrylate monomer and a selected acid group containing monomer, e.g. 2-acrylamido-2-methylpropane sulfonic acid.

U.S. Pat. No. 4,335,938 to Giglia discloses electrochromic devices having a layer of tungsten oxide in contact with a layer of organic electrolyte resin comprising a hydrophilic layer of homopolymer of poly(2-acrylamido-2-methylpropane sulfonic acid) with electrode means for changing electrochromic properties of the device. A conventional electrochromic device is described as having a transparent electrochromic electrode comprising a glass substrate with a conductive tin oxide layer and an electrochromic, e.g. tungsten oxide, film; a pigmented, ion-conducting medium layer comprising a self-supporting layer of ion-conductive polymer having a pigment dispersed therein; and an opaque counter electrode such as carbon paper.

U.S. Pat. No. 4,361,385 to Huang et al. discloses electrochromic devices having a layer of electrochromic tungsten oxide in contact with a polymeric electrolyte wherein the stability and speed of the device are improved by using a copolymer of 2-acrylamido-2-methylpropane sulfonic acid and vinyl sulfonic acid as the polymer electrolyte. An electrochromic film on an electrode is prepared by evaporation of an amorphous film of tungsten oxide onto a glass substrate coated with conductive tin oxide. The polymer mixture is cast, dried and hydrated in contact with the electrochromic film, and then a second electrode consisting of paper-carbon is pressed against the polymer layer with a second tin oxide coated glass plate backing the carbon-paper electrode.

U.S. Pat. No. 4,375,318 to Giglia et al. discloses electrochromic devices having a layer of electrochromic material, e.g. tungsten oxide, in contact with a layer of organic electrolyte resin, with electrode means for changing electrochromic properties of the devices by electric field means. The electrolyte layer comprises a hydrophilic layer of homopolymer of poly(2-acrylamido-2-methylpropane sulfonic acid) with an organic humectant. An electrochromic device is prepared by thermal evaporation of an electrochromic tungsten oxide film onto an electroconductive tin oxide coated glass substrate. A pigmented resin solution is coated over the tungsten oxide and dried to form an ion-conductive polymer film which is hydrated to enhance ionic conductivity. An electrically conductive paper counter-electrode is pressed against the polymer with a graphite coated stainless steel plate.

U.S. Pat. No. 4,478,991 to Huang et al. discloses electrochromic devices having a layer of electrochromic material, e.g. tungsten oxide, in contact with a polymeric electrolyte layer, the stability and speed of the device being improved by using a copolymer of 2-acrylamido-2-methylpropane sulfonic acid and vinyl sulfonic acid as the polymer electrolyte. An electrochromic film on an electrode is prepared by evaporation of an amorphous film of tungsten oxide onto a glass substrate coated with conductive tin oxide. The polymer mixture is cast over the electrochromic film, dried to form a solid film and hydrated to enhance ion conductivity. A second electrode consisting of a paper-carbon structure is pressed against the polymer layer using a conductive tin oxide coated glass plate backing the paper counter electrode.

U.S. Pat. No. 4,645,308 to Tracy et al. discloses a solid-state transition metal oxide device comprising a plurality of layers including an electrochromic oxide layer and anode and cathode contacts. Coloration is actuated within the electrochromic oxide layer by application of a predetermined potential and the coloration action is adapted to sweep across the length of the electrochromic oxide layer.

SUMMARY OF THE INVENTION

The present invention provides an electrochromic cell which is transparent, and which darkens and bleaches completely at an applied electrical potential of less than 1.0 volt, positive and negative respectively. The present invention accomplishes the objective by means of a conductive metallic mesh counter electrode which allows transparency while insuring uniform rapid charge distribution over a large surface area and participating in a balancing half-cell reaction at a sufficient low potential to prevent electrolysis of water and concurrent gas evolution which occur at a higher voltage in the absence of the metal grid. The metal grid is contacted with a copolymer of acrylamidopropane sulfonic acid and acrylic acid to promote adhesion with an acidic polymer electrolyte. The copolymer of the present invention may also be used as the polymer electrolyte.

DESCRIPTION OF THE PREFERRED EMBODIMENTS

Figure 1:
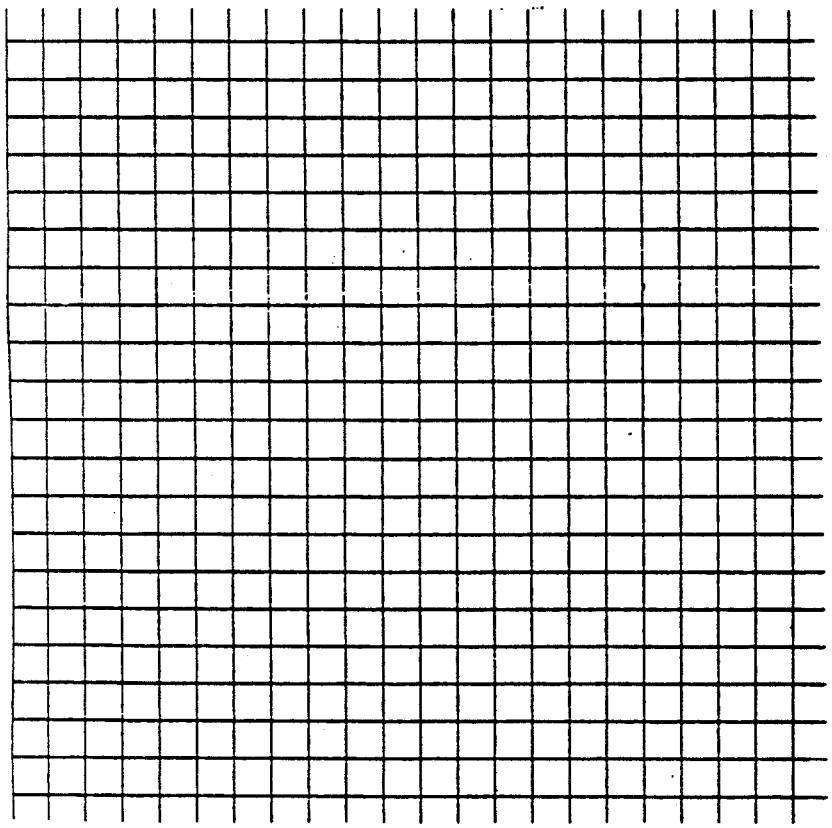
FIG. 1 illustrates a metal grid useful as an electrode member in accordance with the present invention.

Conventional electrochromic cells comprise a thin film of a persistent electrochromic material, i.e. a material responsive to the application of an electric field of a given polarity to change from a high-transmittance, non-absorbing state to a lower-transmittance, absorbing or reflecting state and remaining in the lower-transmittance state after the electric field is discontinued, preferably until an electric field of reversed polarity is applied to return the material to the high-transmittance state. The electrochromic film is in ion-conductive contact, preferably direct physical contact, with a layer of ion-conductive polymer layer. The electrochromic film and ion-conductive polymer layers are disposed between two electrodes.

As a voltage is applied across the two electrodes, ions are conducted through the ion-conducting polymer layer. When the electrode adjacent to the electrochromic film is the cathode, application of an electric field causes darkening of the film. Reversing the polarity causes reversal of the electrochromic properties, and the film reverts to its high transmittance state. Typically, the electrochromic film, preferably tungsten oxide, is deposited on a glass substrate coated with an electroconductive film such as tin oxide to form one electrode. The counter electrode of the prior art has typically been a carbon-paper structure backed by a similar tin oxide coated glass substrate or a metal plate.

While this conventional electrochromic device structure might be acceptable for data displays in items such as digital watches, it is not suitable for large transparent articles such as windows. While the opaque carbon-paper counter electrode may be replaced with a thin conductive film such as tin oxide, indium oxide or gold, these thin film electrodes encounter lateral electrical resistance which decreases the speed and uniformity of charge distribution as the surface area of the device increases. More importantly, in electric fields of about 1 volt, half-cell reactions which result in the evolution of gas from the electrolysis of water occur at the counter electrode, depending on the polarity, as follows:

| Electrode | Reaction | Standard Potential |
|---|---|---|
| Cathode | $2H_2O + 2e^- \longrightarrow H_2 + 2OH^-$ | $-0.828$ volts |
| Anode | $2H_2O \longrightarrow 4H^+ + O_2 + 4e^-$ | $-1.229$ volts |

The hydrogen and oxygen gases produced by these reactions form bubbles which impair the optical properties of an electrochromic cell for use as a window.

The present invention involves the use of a metal mesh as the counter electrode, allowing transparency while providing uniform rapid charge distribution over a large surface area and participating in a balancing half-cell reaction at a lower potential which prevents electrolysis of water and concurrent gas evolution which would otherwise occur according to the following reactions, wherein x is typically up to about 0.5:

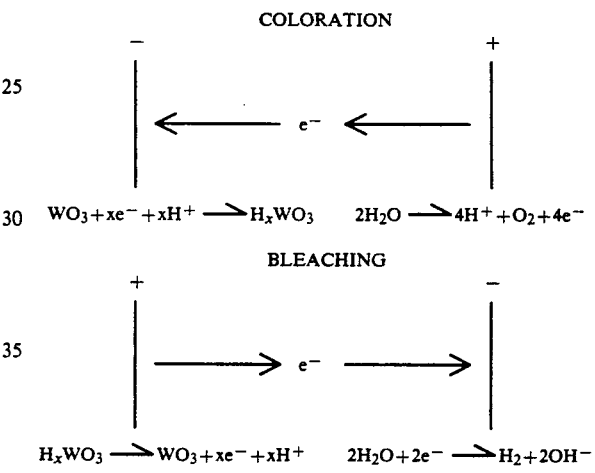

In accordance with the present invention, instead of the hydrolysis of water at the counter electrode, pictured on the right above, the balancing half-cell reaction in response to the electrochromic transition of tungsten oxide is the oxidation or reduction of the metal of the metal grid counter electrode which does not produce gas which can form bubbles and decrease the optical quality of the device.

In a preferred embodiment of the present invention, the electrochromic cell is a transparent laminate comprising two glass substrates. One electrode of the cell comprises one of the glass substrates coated with an electroconductive film, preferably tin oxide having a resistivity of about 25 ohms per square or less. The electrochromic film, preferably tungsten oxide, is deposited over the conductive film, preferably by evaporation or sputtering to a preferred thickness of about 1000 to 4000 Angstroms. The second glass substrate is preferably uncoated glass. To form the counter electrode, a metal grid is disposed adjacent to the second glass substrate. A preferred metal for the grid is copper. For optimum optical properties, the copper grid preferably has line widths on the order of 0.0025 inch (about 0.0635 millimeter) and line spacing of about 20 lines per inch (about 8 lines per centimeter). The metal grid pattern may be square or rectangular, but is preferably a pattern of interconnected circles for optimum optical properties as disclosed in U.S. Pat. No. 4,772,760, the disclosure of which is incorporated herein by reference, preferably produced by electroforming. The electrochromic film/conductive film coated glass plate and the uncoated glass plate with adjacent metal grid counter electrode are preferably spaced about 0.030 inch (about 0.76 millimeter) apart. Disposed in this space is an ion-conductive polymer as known in the art. Preferred ion-conductive polymers include homopolymers of 2-acrylamido-2-methylpropane sulfonic acid (AMPS) and copolymers of AMPS with vinyl sulfonic acid. Preferably, the metal grid counter electrode is embedded in the ion-conductive polymer at the interface of the polymer and the uncoated glass substrate. Electrical connections to the electrochromic film are preferably made by means of a bus bar, while connections to the metal grid counter electrode are preferably made directly. To improve the adhesion between the metal grid and an acidic polymer electrolyte in accordance with the present invention, the metal grid is coated with a primer comprising a copolymer of acrylamidopropane sulfonic acid and acrylic acid, preferably in a molar ratio of about 3:1. The copolymer is prepared by free radical polymerization, and applied to the grid from solution. After the solvent is evaporated, the primed grid is preferably equilibrated at 58 to 62 relative humidity prior to lamination to a polymer electrolyte. The acrylamidopropane sulfonic acid/acrylic acid copolymer of the present invention may itself be the polymer electrolyte.

The cell voltage in accordance with the present invention is sufficiently low so that the following electrolysis reactions of water, with concurrent evolution of gas which can form bubbles, do not occur:

| Electrode | Reaction | Standard Potential |
| --- | --- | --- |
| Anode | $2H_2O \longrightarrow 4H^+ + O_2 + 4e^-$ | $-1.229$ volts |
| Cathode | $2H_2O + 2e^- \longrightarrow H_2 + 2OH^-$ | $-0.828$ volts |

Instead, the metal grid counter electrode participates in balancing half-cell reactions at lower absolute potentials. For a copper grid counter electrode, the following balancing half-cell reactions occur instead:

| Electrode | Reaction | Standard Potential |
| --- | --- | --- |
| Anode | $Cu \longrightarrow Cu^+ + e^-$ | $-0.521$ volt |
|  | $Cu^+ \longrightarrow Cu^{++} + e^-$ | $-0.153$ volt |
| Cathode | $Cu^{++} + e^- \longrightarrow Cu^+$ | $0.153$ volt |
|  | $Cu^+ + e^- \longrightarrow Cu$ | $0.521$ volt |

The present invention will be further understood from the description of a specific example which follows.

EXAMPLE I

Figure 2:
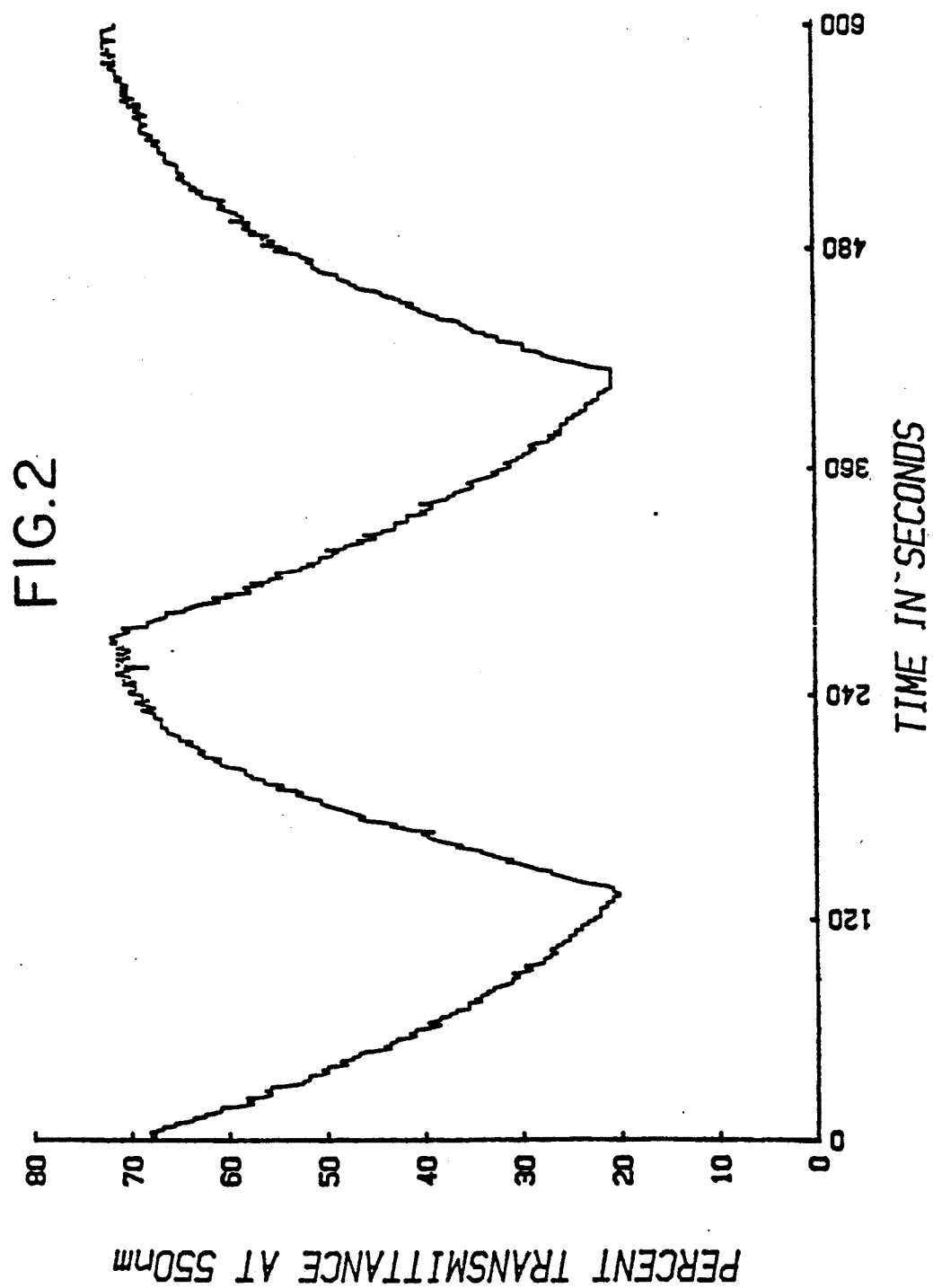
FIG. 2 illustrates the transmittance at 550 nanometers of an electrochromic transparency in accordance with the present invention as a function of time over the course of darkening and bleaching cycles.
Figure 3:
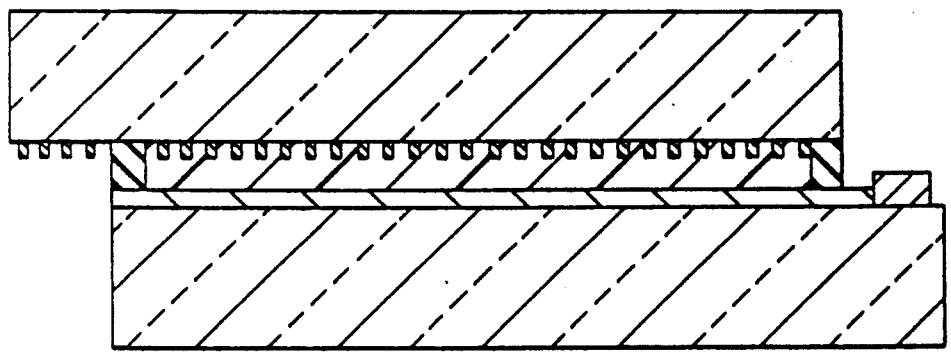
FIG. 3 illustrates in cross section the article of the present invention comprising a transparent substrate, an electroconductive electrode member, an electrochromic film, an ion conductive polymer and a metal grid counterelectrode as shown in FIG. 1 having a primer coating of a copolymer of acrylamidopropane sulfonic acid and acrylic acid.

A transparent electrochromic cell is prepared using two glass cell members. One glass substrate is clear 3 millimeter thick float glass. The other is 5 millimeter thick float glass coated with a tin oxide film having a resistivity of 25 ohms per square. The conductive tin oxide glass member functions as an electrode, with a silver frit bus bar applied about the periphery. An electrochromic tungsten oxide film, $WO_3 \cdot yH_2O$ wherein y represents the extent of hydration, is deposited over the conductive tin oxide film by resistive evaporation at an initial vacuum chamber pressure of about $4 \times 10^{-6}$ Torr. The electrochromic tungsten oxide film is deposited to a thickness of about 4000 Angstroms. The electrochromic film/conductive film coated glass member is positioned parallel with the uncoated glass member at a spacing of 0.030 inch (about 0.76 millimeter) utilizing a butyl rubber spacer. Into this sealed cell construction is cast a polymerization reaction mixture comprising 2-acrylamido-2-methylpropane sulfonic acid, water and organic solvent, which is cured to form an ion-conductive polymer film. Imbedded in the polymer, adjacent to the uncoated glass substrate surface, is an electroformed copper square grid with 0.0025 inch lines at 20 lines per inch spacing, as illustrated in FIG. 1, which functions as a counter electrode and has been precoated with an acrylamidopropane sulfonic acid/acrylic acid copolymer as follows. A solution is prepared comprising 664 grams of acrylamidomethylpropanesulfonic acid and 72 grams of acrylic acid in 2088 grams of distilled water. In a kettle equipped with an overhead stirrer, the solution is purged with nitrogen for 15 minutes, then degassed for 15 minutes before adding 3.48 grams of azobisisobutyronitrile as initiator. The solution is heated at 70° C. for 18 hours to effect polymerization. To the polymer solution is added 3 percent of surfactant, FC-430 from Dupont, and sufficient 95 percent ethanol to reduce the concentration by half. The polymer solution is transferred to a glass tray, and the copper grid is dipped into the polymer solution. The coated grid is dried in a vertical position at ambient temperature for one hour, then heated in an oven at 70° C. for 20 minutes, and finally equilabrated at 55 percent relative humidity prior to lamination. The electrochromic cell thus formed has a luminous transmittance of about 70 percent at a wavelength of 550 nanometers. When an electric current is applied across the cell at a superficial current density of about 0.12 milliamps per square centimeter, the electrochromic film darkens to 20 percent transmittance in about 2 minutes. When the polarity is reversed, the electrochromic film returns to its initial transmittance in about 2 minutes as illustrated in FIG. 2.

The above example is offered only to illustrate the present invention. While the above example utilizes a tungsten oxide electrochromic film, any electrochromic material may be employed, such as transition metal oxides, transition metal sulfides, transition metal oxysulfides, transition metal halides, selenides, tellurides, chromates, molybdates, tungstates, vanadates, niobates, tantalates, titanates, stannates, etc., especially oxides, sulfides and stannates of metals of Groups IV-B, V-B and VI-B, and oxides and sulfides of Lanthanide Series metals, particularly, in addition to tungsten oxide, molybdenum oxide, titanium oxide, vanadium oxide, niobium oxide, cerium oxide, copper stannate, cobalt tungstate and various metal molybdates, titanates and niobates.

Other electrochromic materials which reverse by short-circuiting or are effective only at elevated temperatures may also be employed. The ion-conductive layer may be chosen to be permeable to ions other than hydrogen, such as lithium. The metal mesh counter electrode may comprise nickel or other metals or alloys as well as the preferred copper. The metal mesh counter electrode may be coated with another material in order to provide a particularly desired balancing half-cell reaction, i.e. at a potential lower than that of the electrolysis of water, e.g. nickel coated with tungsten oxide or niobium oxide. While electroforming is a preferred method for producing the counter electrode, any method which produces a grid with acceptable optical properties may be employed. The electrode in contact with the electrochromic material may also be in the form of a metal mesh, in which case the grid patterns of the two electrodes may be designed to complement each other or to provide particular optical properties. The substrate members of electrochromic cells may be any suitable transparent material. The scope of the present invention is defined by the following claims.

I claim:

1. In an article of manufacture having variable transmittance in response to an electric field comprising:
   a. a transparent substrate;
   b. an electroconductive electrode member;
   c. a transparent electrochromic film in contact with said electroconductive electrode member;
   d. an ion-conductive polymer in contact with said electrochromic film; and
   e. a metal grid counter electrode in contact with said ion-conductive polymer;
   the improvement which comprises a primer coating on said metal grid comprising a copolymer of acrylamidopropane sulfonic acid and acrylic acid.

2. An article according to claim 1, wherein said transparent substrate is glass.

3. An article according to claim 1, wherein said electroconductive electrode member is a transparent film.

4. An article according to claim 3, wherein said film comprises a conductive material selected from the group consisting of metals and metal oxides.

5. An article according to claim 4, wherein said film comprises a conductive metal oxide selected from the group consisting of indium oxide, tin oxide and mixtures thereof.

6. An article according to claim 1, wherein said electroconductive electrode member is a metal grid.

7. An article according to claim 1, wherein said transparent electrochromic film comprises an electrochromic material selected from the group consisting of transition metal oxides, transition metal sulfides, transition metal oxysulfides, transition metal halides, selenides, tellurides, chromates, molybdates, tungstates, vanadates, niobates, tantalates, titanates and stannates.

8. An article according to claim 7, wherein said electrochromic material is selected from the group consisting of tungsten oxide, molybdenum oxide, titanium oxide, vanadium oxide, niobium oxide, cerium oxide, copper stannate and cobalt tungstate.

9. An article according to claim 8, wherein said electrochromic film comprises tungsten oxide at a thickness of 1000 to 4000 Angstroms.

10. An article according to claim 1, wherein said ion-conductive polymer comprises a copolymer of acrylamidopropane sulfonic acid and acrylic acid.

11. An article according to claim 10, wherein said metal grid counter electrode is embedded in said polymer layer.

12. An article according to claim 1, wherein said metal grid comprises a metal selected from the group consisting of nickel and copper.

13. An article according to claim 12, wherein said metal grid comprises copper.

14. An article according to claim 1, wherein said metal grid comprises a coating of a material beneath said primer coating which undergoes a half-cell reaction at a potential lower than that of the electrolysis of water.

15. An article according to claim 14, wherein said material is selected from the group consisting of tungsten oxide and niobium oxide.

16. An article according to claim 1, wherein said metal grid is an electroformed grid.

17. An article according to claim 1, further comprising a second transparent substrate adjacent to said metal grid counter electrode.

18. An article according to claim 17, wherein said second transparent substrate is glass.

19. An article of manufacture having variable transmittance in response to an electric field comprising:
   a. a transparent glass substrate;
   b. an electroconductive electrode member deposited on said substrate;
   c. a transparent electrochromic tungsten oxide film in contact with said electroconductive electrode member;
   d. an ion-conductive polymer layer in contact with said electrochromic film; and
   e. a copper grid counter electrode coated with a copolymer of acrylamidopropane sulfonic acid and acrylic acid in contact with said ion-conductive polymer layer.

* * * * *